US012614841B2

(12) United States Patent
Jin et al.

(10) Patent No.: US 12,614,841 B2
(45) Date of Patent: Apr. 28, 2026

(54) CEILING ANTENNA

(71) Applicants: BEIJING BOE SENSOR TECHNOLOGY CO., LTD., Beijing (CN); BOE TECHNOLOGY GROUP CO., LTD., Beijing (CN)

(72) Inventors: Yunnan Jin, Beijing (CN); Shuo Yang, Beijing (CN); Zhe Chen, Beijing (CN); Lei Wang, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 582 days.

(21) Appl. No.: 17/923,751

(22) PCT Filed: Dec. 23, 2021

(86) PCT No.: PCT/CN2021/140928

§ 371 (c)(1),
(2) Date: Nov. 7, 2022

(87) PCT Pub. No.: WO2023/115474

PCT Pub. Date: Jun. 29, 2023

(65) Prior Publication Data

US 2024/0222854 A1 Jul. 4, 2024

(51) Int. Cl.

| | |
|---|---|
| ***H01Q 1/36*** | (2006.01) |
| ***H01Q 1/12*** | (2006.01) |
| ***H01Q 19/10*** | (2006.01) |

(52) U.S. Cl.

CPC ................. *H01Q 1/36* (2013.01); *H01Q 1/12* (2013.01); *H01Q 19/104* (2013.01)

(58) Field of Classification Search

CPC .......... H01Q 1/36; H01Q 1/12; H01Q 19/104; H01Q 1/229; H01Q 1/38

See application file for complete search history.

(56) References Cited

U.S. PATENT DOCUMENTS

| | | | | |
|---|---|---|---|---|
| 5,526,172 A * | 6/1996 | Kanack | H01P 9/00 | 359/846 |
| 5,872,546 A * | 2/1999 | Ihara | H01Q 9/40 | 343/893 |

(Continued)

FOREIGN PATENT DOCUMENTS

| | | |
|---|---|---|
| CN | 101340020 A * | 1/2009 |
| CN | 201812930 U * | 4/2011 |

(Continued)

*Primary Examiner* — Dimary S Lopez Cruz
*Assistant Examiner* — Bamidele A Immanuel
(74) *Attorney, Agent, or Firm* — WHDA, LLP

(57) ABSTRACT

The ceiling antenna includes a reflecting bottom plate, wherein the reflecting bottom plate has a via hole; a supporting plate, wherein the supporting plate is fixed to the reflecting bottom plate, and a plane where the supporting plate is located is perpendicular to a plane where the reflecting bottom plate is located; a radiation oscillator, wherein the radiation oscillator is adhered to the supporting plate, the radiation oscillator includes a first radiator, the first radiator has a grid-line-like structure, and a shape of an outer contour of the first radiator is a rectangle having at least one cut corner; and a connector, wherein the connector is located on one side of the reflecting bottom plate that is away from the radiation oscillator, the via hole exposes a part of area of the connector, and the connector is electrically connected to the radiation oscillator through the via hole.

14 Claims, 8 Drawing Sheets

(56) References Cited

U.S. PATENT DOCUMENTS 6,404,394 B1 * 6/2002 Hill ........................ H01Q 13/10 343/702
6,992,627 B1 * 1/2006 Honda ................. H01Q 9/0421 343/702
9,537,216 B1 * 1/2017 Kontopidis .............. H01Q 3/36
10,367,248 B2 * 7/2019 Toyao .................... H01Q 19/10
10,487,498 B2 * 11/2019 Hagiwara ................ H01Q 1/50
10,944,186 B2 * 3/2021 Van Gils ................ H01Q 1/521
2002/0149519 A1 * 10/2002 Varadan ................... H01Q 1/36 343/700 MS
2003/0142018 A1 * 7/2003 Lange .................... H01Q 1/007 343/897
2004/0125020 A1 * 7/2004 Hendler ................. H01Q 21/30 343/846
2004/0150566 A1 * 8/2004 Yuanzhu ................ H01Q 5/378 343/895
2004/0212535 A1 * 10/2004 Tang .................... H01Q 9/0407 343/702
2005/0162332 A1 * 7/2005 Schantz ............... H01Q 21/205 343/797
2006/0097953 A1 * 5/2006 Regala ..................... H01Q 9/40 343/906
2006/0164307 A1 * 7/2006 Smith ...................... H01Q 1/38 343/700 MS
2011/0025577 A1 * 2/2011 Ward ..................... H01Q 21/08 343/893
2012/0287002 A1 * 11/2012 Parsche .................... H01Q 1/38 343/702
2013/0082890 A1 * 4/2013 Wang ....................... H01Q 1/48 343/810
2013/0257673 A1 * 10/2013 Wang ....................... H01Q 1/38 343/905
2014/0106684 A1 * 4/2014 Burns .................... H01Q 21/28 29/601
2014/0354510 A1 * 12/2014 Li ........................ H01Q 25/001 343/893
2015/0035715 A1 * 2/2015 Kim ..................... H01Q 9/0421 343/787
2015/0061957 A1 * 3/2015 Chung ................... H01Q 9/285 343/797
2015/0325923 A1 * 11/2015 Hiramatsu ............... H01Q 9/16 343/815
2016/0380356 A1 * 12/2016 Thakur .................. H01Q 1/243 343/745
2018/0045822 A1 * 2/2018 Wötzel ..................... H01Q 9/28
2018/0342789 A1 * 11/2018 Jiang ...................... H01Q 1/528
2020/0021008 A1 * 1/2020 Yong .................... H01Q 21/005
2021/0083398 A1 * 3/2021 Ko ....................... H01Q 21/061
2021/0151860 A1 * 5/2021 Park ....................... H01Q 21/24
2021/0328351 A1 * 10/2021 Avser ................... H01Q 19/028
2022/0276682 A1 * 9/2022 Yu .......................... H01Q 21/08
2022/0320709 A1 * 10/2022 Yu .......................... H01Q 1/243
2023/0352837 A1 * 11/2023 Luk ...................... H01Q 9/0457

FOREIGN PATENT DOCUMENTS

CN 102637962 A * 8/2012
CN 101340019 B * 3/2013
CN 103151605 A * 6/2013
CN 102646871 B * 8/2016
CN 106252852 A * 12/2016 ............... H01Q 1/52
CN 109390703 A * 2/2019 ........... H01Q 19/106
CN 210897621 U * 6/2020
CN 213425186 U * 6/2021
CN 113258275 A * 8/2021 ............... H01Q 1/38

* cited by examiner

CEILING ANTENNA

TECHNICAL FIELD

The present application relates to the technical field of mobile communication and, more particularly, to a ceiling antenna.

BACKGROUND

With the development of the technology of mobile communication, ceiling antennas are an indispensable device in mobile-communication apparatuses. Besides the higher requirements on the electric performance of ceiling antennas, people are having increasingly higher requirements on the appearance of the antennas. The ceiling antennas in the related art have a narrow frequency bandwidth, and a poor appearance.

Currently, it is urgently needed to provide a novel ceiling antenna, to solve the above problems.

SUMMARY

In the first aspect, an embodiment of the present application provides a ceiling antenna, wherein the ceiling antenna includes:

- a reflecting bottom plate, wherein the reflecting bottom plate has a via hole;
- a supporting plate, wherein the supporting plate is fixed to the reflecting bottom plate, and a plane where the supporting plate is located is perpendicular to a plane where the reflecting bottom plate is located;
- a radiation oscillator, wherein the radiation oscillator is adhered to the supporting plate, the radiation oscillator includes a substrate and a first radiator located on the substrate, the first radiator has a grid-line-like structure, the substrate is located between the supporting plate and the first radiator, and a shape of an outer contour of the first radiator is a rectangle having at least one cut corner; and
- a connector, wherein the connector is located on one side of the reflecting bottom plate that is away from the radiation oscillator, the via hole exposes part of area of the connector, and the connector is electrically connected to the radiation oscillator through the via hole.

In some embodiments of the present application, the ceiling antenna further includes an antenna housing, and the radiation oscillator is located in a cavity formed by the reflecting bottom plate and the antenna housing.

In some embodiments of the present application, the reflecting bottom plate includes a bottom plate and a reflecting plate located on the bottom plate, the reflecting plate includes a base plate and a grid-line-like reflecting layer located on the base plate, the base plate is located between the bottom plate and the reflecting layer, and the connector is located on one side of the bottom plate that is away from the reflecting layer.

In some embodiments of the present application, all of materials of the bottom plate, the base plate, the supporting plate, the substrate and the antenna housing are a light transmitting insulative material.

In some embodiments of the present application, the first radiator is symmetrical with respect to a reference plane, wherein the reference plane passes through a geometric center of the connector, and is perpendicular to the plane where the reflecting bottom plate is located.

In some embodiments of the present application, the shape of the outer contour of the first radiator is a rectangle having four cut corners, and two of the four cut corners are isosceles right triangles.

In some embodiments of the present application, the shape of the outer contour of the first radiator is a rectangle having four cut corners, all of the four cut corners are an arc-shaped cut corner, and the shape of the outer contour of the first radiator is a rounded rectangle.

In some embodiments of the present application, the first radiator includes a hollowed-out component, the hollowed-out component is located in a middle of the first radiator, and a shape of an outer contour of the hollowed-out component is any one of an arc shape, a polygon, and a shape spliced by the arc shape and the polygon.

In some embodiments of the present application, the arc shape includes any one of a circle, an ellipse, a meniscus shape and a sector shape, and the polygon includes any one of a triangle, a quadrangle, a pentagon and a hexagon.

In some embodiments of the present application, the radiation oscillator further includes at least one second radiator located on the substrate, the second radiator is connected to the first radiator, and the second radiator has a same grid-line-like structure as the grid-line-like structure of the first radiator.

In some embodiments of the present application, a shape of an outer contour of the second radiator is an arc shape or a polygon.

In some embodiments of the present application, the ceiling antenna further includes a fixing member, and the supporting plate is fixed to the reflecting bottom plate by the fixing member.

In some embodiments of the present application, the fixing member includes an L-shaped right-angle connecting member, and a material of the fixing member is a light transmitting insulative material.

In some embodiments of the present application, the ceiling antenna further includes a bonding part, and the bonding part is located between the substrate of the radiation oscillator and the supporting plate, and is configured to bond the radiation oscillator and the supporting plate together.

In some embodiments of the present application, a shape of the cavity formed by the reflecting bottom plate and the antenna housing is a columnar shape or a hemi-ellipsoidal shape.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures that are described below are merely embodiments of the present application, and a person skilled in the art may obtain other figures according to these figures without paying creative work.

Figure 12:
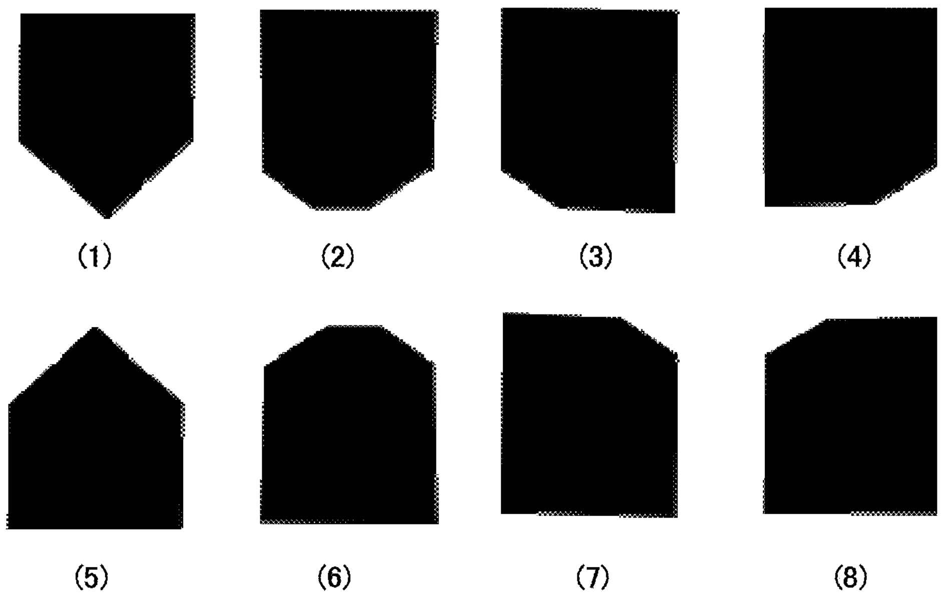
Figure 13:
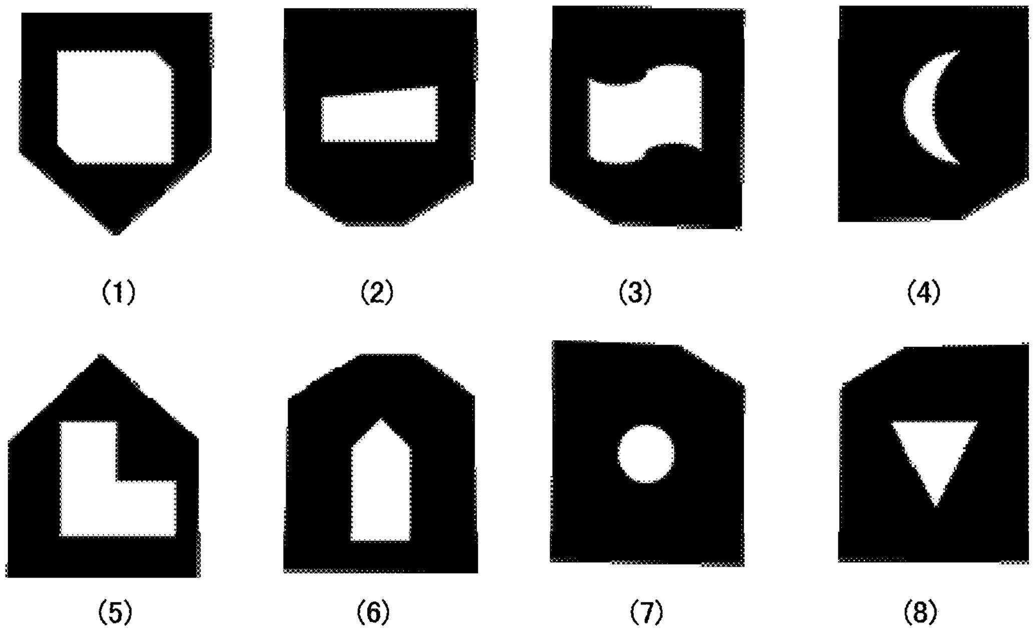
Figure 14:
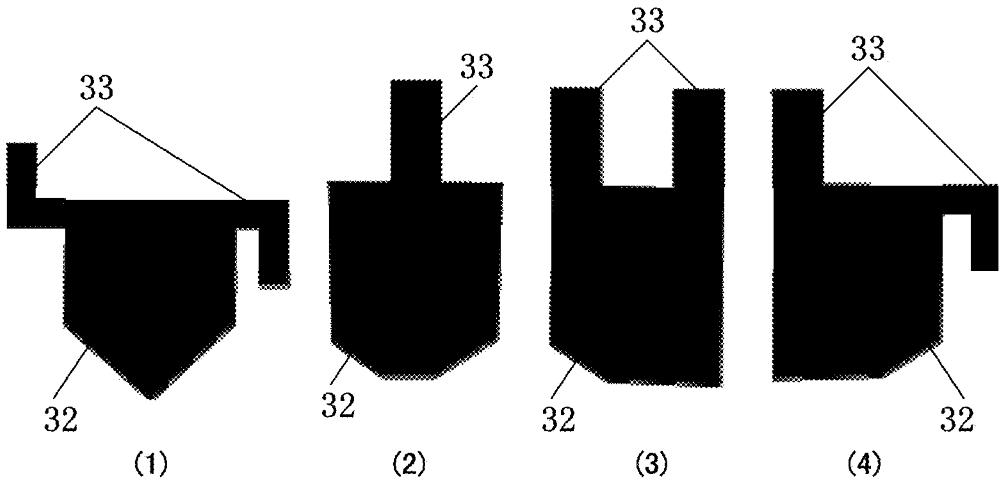

The first pattern to the eighth pattern of FIG. 12 are schematic structural diagrams of eight radiation oscillators according to the embodiments of the present application;

The first pattern to the eighth pattern of FIG. 13 are schematic structural diagrams of eight radiation oscillators having a hollowed-out component according to the embodiments of the present application; and The first pattern to the fourth pattern of FIG. 14 are schematic structural diagrams of four radiation oscillators including a first radiator and a second radiator according to the embodiments of the present application.

DETAILED DESCRIPTION

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the drawings, in order for clarity, the thicknesses of the regions and the layers might be exaggerated. In the drawings, the same reference numbers represent the same or similar components, and therefore the detailed description on them are omitted. Moreover, the drawings are merely schematic illustrations of the present application, and are not necessarily drawn to scale.

Unless stated otherwise in the context, throughout the description and the claims, the term "comprise" is interpreted as the meaning of opened containing, i.e., "including but not limited to". In the description of the present disclosure, the terms "one embodiment", "some embodiments", "exemplary embodiments", "example", "specific example" or "some examples" are intended to indicate that specific features, structures, materials or characteristics related to the embodiment or example are comprised in at least one embodiment or example of the present application. The illustrative indication of the above terms does not necessarily refer to the same one embodiment or example. Moreover, the specific features, structures, materials or characteristics may be comprised in any one or more embodiments or examples in any suitable manner.

In the embodiments of the present application, terms such as "first" and "second" are used to distinguish identical items or similar items that have substantially the same functions and effects, merely in order to clearly describe the technical solutions of the embodiments of the present application, and should not be construed as indicating or implying the degrees of importance or implicitly indicating the quantity of the specified technical features.

Figure 1:
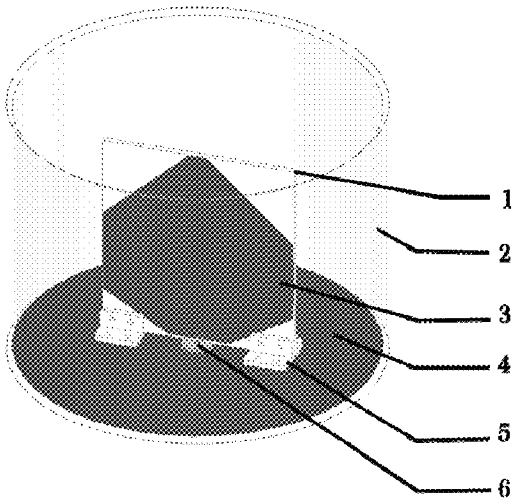
FIGS. 1, 2, 4 and 5 are schematic structural diagrams of four ceiling antennas according to the embodiments of the present application.
Figure 3A:
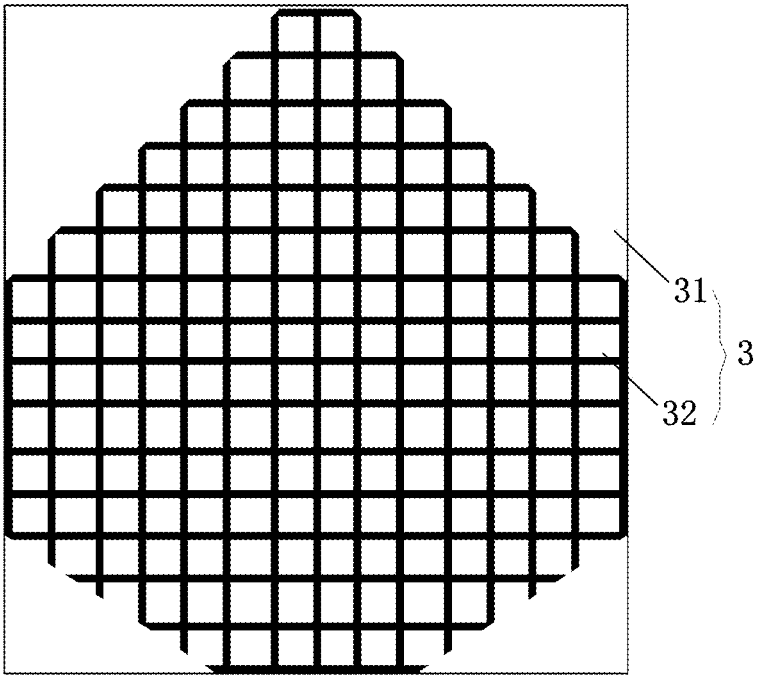
FIG. 3*a* is a schematic structural diagram of a radiation oscillator according to an embodiment of the present application.

An embodiment of the present application provides a ceiling antenna. Referring to FIG. 1, the ceiling antenna includes:

- a reflecting bottom plate 4, wherein the reflecting bottom plate 4 has a via hole (not marked);
- a supporting plate 1, wherein the supporting plate 1 is fixed to the reflecting bottom plate 4, and the plane where the supporting plate 1 is located is perpendicular to the plane where the reflecting bottom plate 4 is located;
- a radiation oscillator 3, wherein the radiation oscillator 3 is adhered to the supporting plate 1, referring to FIG. 3*a*, the radiation oscillator 3 includes a substrate 31 and a first radiator 32 located on the substrate 31, the first radiator 32 has a grid-line-like structure, the substrate 31 is located between the supporting plate 1 and the first radiator 32, and the shape of the outer contour of the first radiator 32 is a rectangle having at least one cut corner; and
- a connector 6, wherein the connector 6 is located on the side of the reflecting bottom plate 4 that is away from the radiation oscillator 3, the via hole exposes a part of the area of the connector 6, and the connector 6 is electrically connected to the radiation oscillator 3 through the via hole.

In an exemplary embodiment, a material of the first radiator 32 is a metal material, such as copper, titanium and magnesium, or may also be a glass fiber having a metal coating, or may also be a resin adhered by an electrically conductive carbon material at surface, wherein the electrically conductive carbon material includes graphene, carbon fiber and carbon nanotube.

As an example, the range of the line width of the grid lines of the first radiator 32 may be 2 μm-30 μm, the range of the spacing between the neighboring grid lines of the first radiator 32 may be 50 μm-200 μm, and the range of the thickness of the first radiator 32 in the direction perpendicular to the substrate 31 may be 1 μm-10 μm.

In an exemplary embodiment, the line width of the grid lines of the first radiator 32 may be configured to be less than the spacing between the neighboring grid lines of the first radiator 32, and the thickness of the first radiator 32 in the direction perpendicular to the substrate 31 may be configured to be less than the line width of the grid lines of the first radiator 32.

In an exemplary embodiment, the orthographic projection of the outer contour of the first radiator 32 on the substrate 31 may coincide with the outer contour of the substrate 31. Alternatively, referring to FIG. 3*a*, the orthographic projection of the outer contour of the first radiator 32 on the substrate 31 is located within the outer contour of the substrate 31.

In an exemplary embodiment, the orthographic projection of the outer contour of the substrate 31 on the supporting plate 1 may coincide with the outer contour of the supporting plate 1. Alternatively, the orthographic projection of the outer contour of the substrate 31 on the supporting plate 1 is located within the outer contour of the supporting plate 1.

It should be noted that the substrate 31 of the radiation oscillator 3 serves to support the first radiator 32 of the grid-line-like structure, to prevent damage of the grid-line-like structure. Furthermore, in order not to affect the light transmittance of the first radiator 32, the substrate 1 may employ a high-light-transmittance PET (Polyethylene Terephthalate) material or PI (Polyimide) material.

In practical applications, the grid-line-like first radiator 32 may be produced by etching or impressing.

The radiation oscillator 3 is adhered to the supporting plate 1. The supporting plate 1 is a base plate of a certain mechanical strength, and further supports the first radiator 32 of the grid-line-like structure and the substrate 1, thereby improving the structural stability of the ceiling antenna.

In an exemplary embodiment, the range of the thickness of the supporting plate 1 in the direction perpendicular to the radiation oscillator 3 is 1 mm-3 mm.

In an exemplary embodiment, the material of the supporting plate 1 may be a transparent rigid plastic, for example, PC (Polycarbonate), COP (Copolymers of Cycloolefin) or PMMA (Polymethyl Methacrylate). Alternatively, the material of the supporting plate 1 may also be a low-loss optical glass.

In the embodiments of the present application, in an aspect, by configuring the first radiator 32 to be of the grid-line-like structure, in cooperation with the light transmitting substrate 31, the radiation oscillator 3 of a good light transmittance may be obtained. In another aspect, by configuring that the line width of the grid lines of the first radiator 32 is less than the spacing between the neighboring grid lines of the first radiator 32, the first radiator 32 may have a larger hollowed-out region, thereby increasing the transmittance of the first radiator 32. In yet another aspect, by configuring that the thickness of the first radiator 32 in the direction perpendicular to the substrate 31 is less than the line width of the grid lines of the first radiator 32, because if the thickness is lower, the light transmittance is higher, the light transmitting performance of the radiation oscillator 3 is further increased, whereby, without affecting the electric performance of the radiation oscillator 3, the transparentized radiation oscillator is obtained, thereby improving the aesthetic degree of the ceiling antenna, to enable the ceiling antenna to better blend with the ambient environment.

The meaning of the above-described rectangle having at least one cut corner is that, based on a rectangle, at least one of the four corners of the rectangle is cut.

In an exemplary embodiment, when the corner cutting is being performed, the cutting line may be a straight line, whereby the obtained shape is a polygon. Alternatively, the cutting line may be an arc, whereby the obtained shape may be a rectangle having at least one rounded corner.

In an exemplary embodiment, the radiation oscillator 3 has four cut corners (all of which are right-triangle cut corners). Two of the cut corners are isosceles right triangles, and, referring to FIG. 2, $\angle\beta=45°$. The other two cut corners are equal, and $\angle\alpha=32.9°$.

In the embodiments of the present application, by configuring that the shape of the outer contour of the first radiator 32 is a rectangle having at least one cut corner, the resonance sites of the first radiator 32 may be significantly increased, which may increase the frequency bandwidth of the ceiling antenna, to enable the ceiling antenna to have more extensive applications.

In an exemplary embodiment, the connector 6 may be a 50-ohm Small A Type (SMA) connector, which may facilitate the connection of the ceiling antenna to other electric devices. It should be noted that SMA connectors are a typical type of microwave high-frequency connecting interfaces, and the ceiling antenna receives inputted signals from the exterior by using the 50-ohm SMA connector.

The particular materials and colors of the reflecting bottom plate 4, the supporting plate 1, the substrate 31 and the connector 6 are not limited herein, and their materials and colors may be particularly configured according to practical environmental demands. In the embodiments of the present application, in order to improve the aesthetic degree and the invisibility of the ceiling antenna, the case in which all of their materials are a light transmitting material is taken as an example for the description.

In the embodiments of the present application, in an aspect, by configuring that the radiation oscillator 3 of the ceiling antenna has the first radiator 31 of the grid-line-like structure, the light transmitting performance of the radiation oscillator 3 may be improved, whereby, without affecting the electric performance of the radiation oscillator 3, the transparentized radiation oscillator 3 is obtained, thereby improving the aesthetic degree of the ceiling antenna, to enable the ceiling antenna to better blend with the ambient environment. In another aspect, by configuring that the shape of the outer contour of the first radiator 32 is a rectangle having at least one cut corner, the resonance sites of the first radiator 32 may be significantly increased, which may increase the frequency bandwidth of the ceiling antenna, to enable the ceiling antenna to have more extensive applications.

Figure 5:
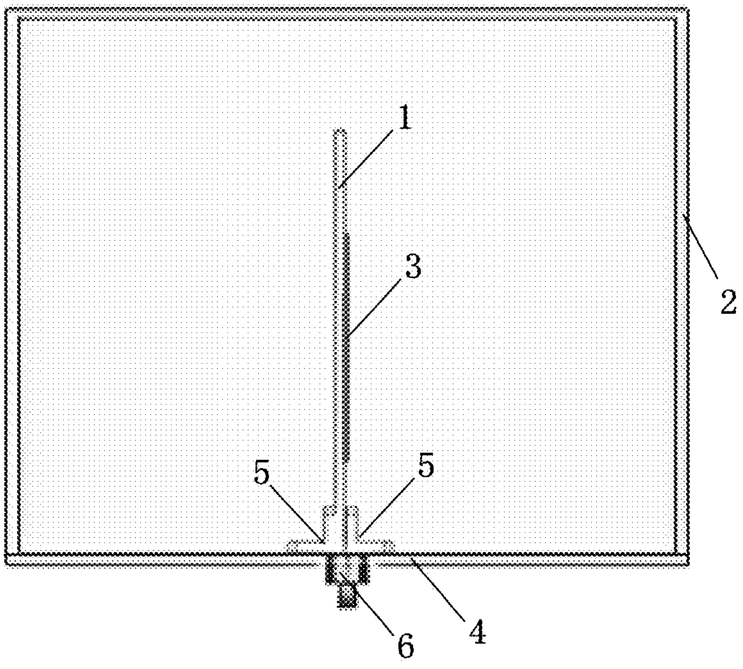

In some embodiments of the present application, referring to FIGS. 1 and 5, the ceiling antenna further includes an antenna housing 2, and the radiation oscillator 3 is located in a cavity formed by the reflecting bottom plate 4 and the antenna housing 2.

In an exemplary embodiment, by disposing the antenna housing 2, the radiation oscillator 3 may be protected to a certain extent. Furthermore, the material of the antenna housing 2 may be a light transmitting insulative material, thereby improving the aesthetic degree of the ceiling antenna, and improving its invisibility and capacity of blending with the environment.

It should be noted that the shape of the antenna housing 2 and the shape of the reflecting bottom plate 4 are required to match to a certain extent, so that the antenna housing 2 and the reflecting bottom plate 4 may form a closed cavity. As the shapes of them match, the particular shape of the antenna housing 2 is not limited herein.

As an example, the structure formed by the reflecting bottom plate 4 and the antenna housing 2 has a cylindrical shape, or has a prismatic shape, or has a hemispherical shape, or has a hemi-ellipsoidal shape. The prismatic shape may be a trigonal prism shape, a tetragonal prism shape, a pentagonal prism shape or a hexagonal prism shape.

Figure 2:
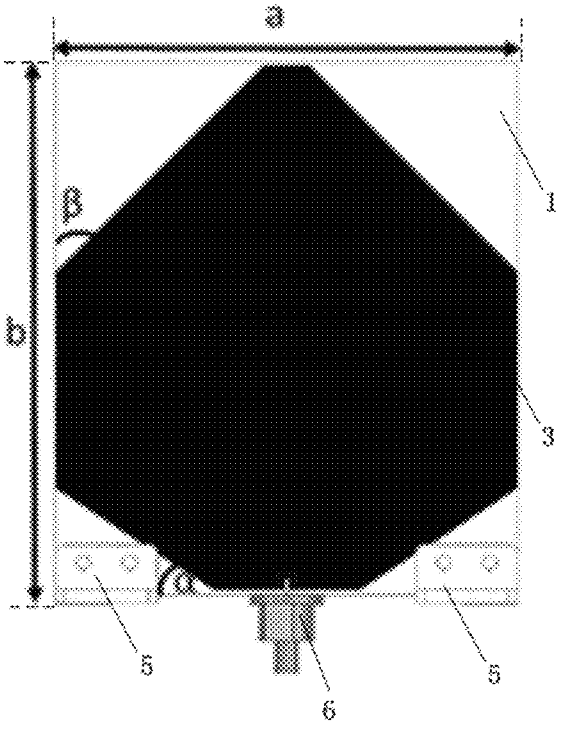
Figure 3B:
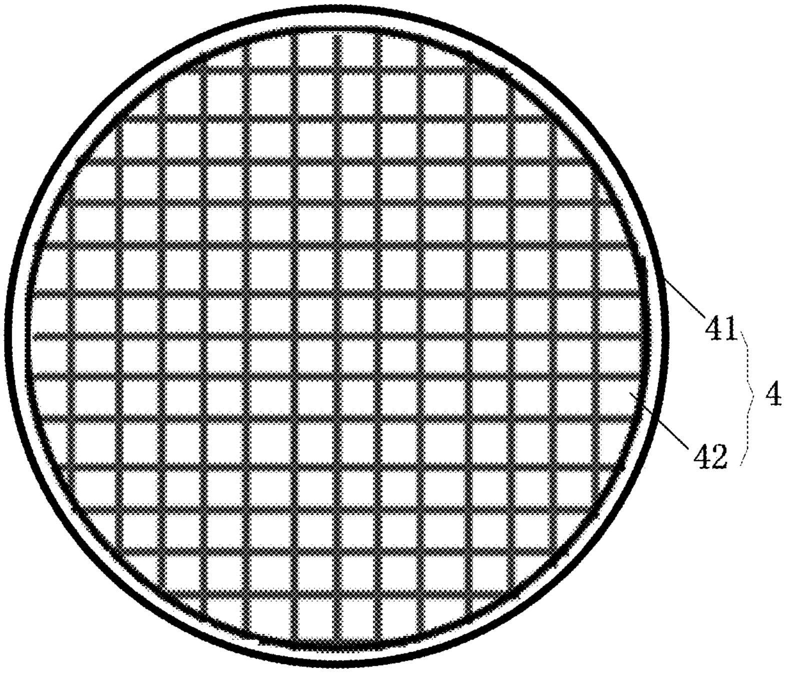
FIG. 3*b* is a schematic structural diagram of a reflecting bottom plate according to an embodiment of the present application.
Figure 4:
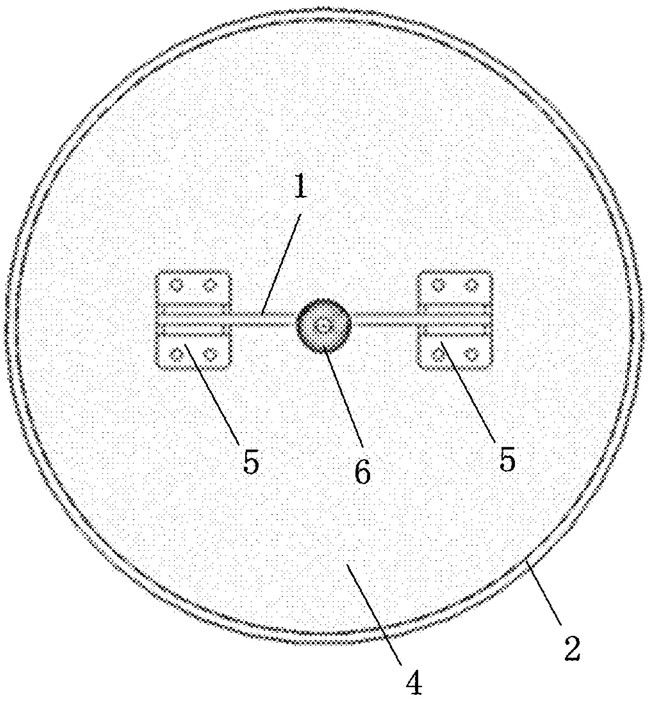

In some embodiments of the present application, referring to FIG. 3*b*, the reflecting bottom plate 4 includes a bottom plate 41 and a reflecting plate 42 located on the bottom plate 41, the reflecting plate 42 includes a base plate (not marked) and a grid-line-like reflecting layer 42 located on the base plate, the base plate is located between the bottom plate 41 and the reflecting layer 42, and, as shown in FIG. 2, the connector 6 is located on the side of the bottom plate 41 that is away from the reflecting layer 42.

The function of the base plate is similar to that of the substrate 31 of the radiation oscillator 3 as described above, which is to support the grid-line-like structure, to prevent damage thereof. Herein, the material of the base plate may be configured to be the same as the material of the substrate 1 described above.

The bottom plate 41 is a base plate of a certain mechanical strength, and further supports the grid-line-like reflecting layer 42 and the base plate, thereby improving the structural stability of the ceiling antenna.

In an exemplary embodiment, the range of the thickness of the bottom plate 41 in the direction perpendicular to the reflecting plate 42 is 1 mm-3 mm.

In an exemplary embodiment, the material of the bottom plate 41 may be a transparent rigid plastic, for example, Polycarbonate (PC), Copolymers of Cycloolefin (COP) or Polymethyl Methacrylate (PMMA). Alternatively, the material of the bottom plate 41 may also be a low-loss optical glass.

In an exemplary embodiment, the material of the grid-line-like reflecting layer 42 is a metal material, such as copper, titanium and magnesium, or may also be a glass fiber having a metal coating, or may also be a light transmitting resin adhered by an electrically conductive carbon material at surface, wherein the electrically conductive carbon material includes graphene, carbon fiber and carbon nanotube.

As an example, the range of the line width of the grid lines of the reflecting layer 42 may be 2 μm-30 μm, the range of the spacing between the neighboring grid lines of the reflecting layer 42 may be 50 μm-200 μm, and the range of the thickness of the reflecting layer 42 in the direction perpendicular to the base plate may be 1 μm-10 μm.

In an exemplary embodiment, the line width of the grid lines of the reflecting layer 42 may be configured to be less than the spacing between the neighboring grid lines of the reflecting layer 42, and the thickness of the reflecting layer 42 in the direction perpendicular to the base plate may be configured to be less than the line width of the grid lines of the reflecting layer 42.

In an exemplary embodiment, it may be configured that the orthographic projection of the outer contour of the grid-line-like reflecting layer 42 on the base plate coincides with the outer contour of the base plate, or the orthographic projection of the outer contour of the grid-line-like reflecting layer 42 on the base plate is located within the outer contour of the base plate.

In an exemplary embodiment, it may be configured that the orthographic projection of the outer contour of the base plate on the bottom plate 41 is located within the outer contour of the bottom plate 41. Alternatively, it may be configured that the orthographic projection of the outer contour of the base plate on the bottom plate 41 coincides with the outer contour of the bottom plate 41.

In the embodiments of the present application, in an aspect, by configuring the reflecting layer 42 to be of the grid-line-like structure, in cooperation with the light transmitting base plate and the light transmitting bottom plate 41, the reflecting bottom plate 4 of a good light transmittance may be obtained. In another aspect, by configuring that the line width of the grid lines of the reflecting layer 42 is less than the spacing between the neighboring grid lines of the reflecting layer 42, the reflecting layer 42 may have a larger hollowed-out region, thereby increasing the transmittance of the reflecting layer 42. In yet another aspect, by configuring that the thickness of the reflecting layer 42 in the direction perpendicular to the base plate is less than the line width of the grid lines of the reflecting layer 42, because if the thickness is lower, the light transmittance is higher, the light transmitting performance of the reflecting bottom plate 4 is further improved, whereby, without affecting the reflection and the accumulation of the electric signals by the reflecting bottom plate 4, the transparentized reflecting bottom plate 4 is obtained, thereby improving the aesthetic degree of the ceiling antenna, to enable the ceiling antenna to better blend with the ambient environment.

In some embodiments of the present application, all of the materials of the bottom plate 41, the base plate, the supporting plate 1, the substrate 31 and the antenna housing 2 are a light transmitting insulative material.

As an example, its material may be any one of Polycarbonate (PC), Copolymers of Cycloolefin (COP) and Polymethyl Methacrylate (PMMA).

In practical applications, in order to prevent influence on the electric signals of the antenna by the differences between the dielectric constants and the dielectric-loss tangent angles of different materials, the materials of the above-described components are configured to be the same.

In some embodiments of the present application, referring to FIGS. 2 and 3*a*, the first radiator 32 is symmetrical with respect to a reference plane, wherein the reference plane passes through the geometric center of the connector 6, and is perpendicular to the plane where the reflecting bottom plate 4 is located.

In some embodiments of the present application, the shape of the outer contour of the first radiator 32 is a rectangle having four cut corners, and two of the four cut corners are isosceles right triangles.

In some embodiments of the present application, the shape of the outer contour of the first radiator 32 is a rectangle having four cut corners, all of the four cut corners are an arc-shaped cut corner, and the shape of the outer contour of the first radiator 32 is a rounded rectangle.

In an exemplary embodiment, referring to the third pattern, the fourth pattern, the seventh pattern and the eighth pattern of FIG. 12, the shape of the outer contour of the first radiator 32 is a rectangle having one cut corner. Referring to the first pattern, the second pattern, the fifth pattern and the sixth pattern of FIG. 12, the shape of the outer contour of the first radiator 32 is a rectangle having two cut corners. Certainly, the shape of the outer contour of the first radiator 32 may also be a rectangle having three cut corners or four cut corners, which may be particularly adjusted according to practical situations.

In some embodiments of the present application, referring to the figures in FIG. 13, the first radiator 32 includes a hollowed-out component, the hollowed-out component is located in the middle of the first radiator 32, and the shape of the outer contour of the hollowed-out component is any one of an arc shape, a polygon, and a shape spliced by the arc shape and the polygon.

As an example, the arc shape includes any one of the circle and the ellipse shown in the seventh pattern of FIG. 13 and the meniscus shape and the sector shape shown in the fourth pattern of FIG. 13, and the polygon includes any one of the triangle shown in the eighth pattern of FIG. 13, the quadrangle shown in the second pattern of FIG. 13, the pentagon shown in the sixth pattern of in FIG. 13 and the hexagon shown in the first pattern and the fifth pattern of FIG. 13.

As an example, the arc shape further includes the flag shape shown in the third pattern of FIG. 13.

In some embodiments of the present application, referring to FIG. 14, the radiation oscillator 3 further includes at least one second radiator 33 located on the substrate 31, the second radiator 33 is connected to the first radiator 32, and the second radiator 33 has the same grid-line-like structure as the grid-line-like structure of the first radiator 32.

In some embodiments of the present application, the shape of the outer contour of the second radiator 33 is an arc shape or a polygon.

In the embodiments of the present application, by configuring that the radiation oscillator 3 further includes at least one second radiator 33 located on the substrate 31, and the second radiator 33 is connected to the first radiator 32, the resonance potential of the radiation oscillator is effectively increased, which may effectively increase the frequency bandwidth of the ceiling antenna, to enable the ceiling antenna to have more extensive applications.

In some embodiments of the present application, referring to FIG. 1, FIG. 2, FIG. 4 or FIG. 5, the ceiling antenna further includes a fixing member 5, and the supporting plate 1 is fixed to the reflecting bottom plate 4 by the fixing member 5.

In some embodiments of the present application, referring to FIG. 5, the fixing member 5 includes an L-shaped right-angle connecting member, to ensure that the plane where the supporting plate 1 is located is perpendicular to the plane where the reflecting bottom plate 4 is located, thereby improving the structural stability of the ceiling antenna.

In an exemplary embodiment, the material of the fixing member 5 is a light transmitting insulative material.

In an exemplary embodiment, the fixing member 5 may be fixedly connected to the supporting plate 1 by using a screw.

In some embodiments of the present application, the ceiling antenna further includes a bonding part, and the bonding part is located between the substrate 31 of the radiation oscillator 3 and the supporting plate 1, and is configured to bond the radiation oscillator 3 and the supporting plate 1 together.

In practical applications, because the first radiator 32 is provided on the light transmitting substrate 31, by bonding the substrate 31 and the supporting plate 1 together by using the bonding part, the structural stability of the radiation oscillator 3 may be effectively improved.

In an exemplary embodiment, the bonding part may be an adhesive, for example, an Optically Clear Adhesive (OCA).

In some embodiments of the present application, the shape of the cavity formed by the reflecting bottom plate 4 and the antenna housing 2 is a columnar shape or a hemiellipsoidal shape.

As an example, the columnar shape may be the cylindrical shape shown in FIG. 1, in which case the shape of the reflecting bottom plate 4 is a circular shape. Alternatively, the columnar shape may be a prismatic shape, in which case the shape of the reflecting bottom plate 4 is a polygon.

In the embodiments of the present application, the structure of a single radiation oscillator 3 is employed, the radiation oscillator 3 undergoes corner cutting so as to enable the antenna to obtain a wide working band, and the radiation oscillator 3 and the reflecting bottom plate 4 are connected by using the L-shaped fixing member 5, which improves the stability of the overall structure of the antenna, and expands the application area of the antenna. By configuring the first radiator 32 and the reflecting layer 42 to be of the grid-line-like structure, and configuring the materials of the other components to be the light transmitting materials, the antenna may have an excellent invisibility, and may be perfectly blended with a transparent environment, which effectively beautifies the environment. Furthermore, the ceiling antenna according to the embodiments of the present application, because of its ultra-wide working frequency, may be applied to various communication systems, and has extensive applications.

In the following, a particular structure of the ceiling antenna will be provided, and its working frequency bandwidth and relevant characteristics of radiation directions will be described based on the structure.

Referring to FIGS. 1 and 2, both of the reflecting layer 42 of the reflecting bottom plate 4 and the first radiator 32 of the radiation oscillator 3 are of a metal grid-line-like structure, and the metal is copper. Both of the ranges of the line widths of the grid lines are 2 μm-30 μm, both of the ranges of the spacings between the neighboring grid lines are 20 μm-250 μm, and both of the ranges of the thicknesses of the grid-line-like structures are 1 μm-10 μm.

Both of the materials of the substrate 1 and the base plate are a PET thin film. The range of the total thickness of the PET thin film as the substrate 1 and the first radiator 32 is 50 μm-250 μm, and the range of the total thickness of the PET thin film as the base plate and the reflecting layer 42 is 50 μm-250 μm.

The materials of the bottom plate 41 and the supporting plate 1 are the same, the materials of the antenna housing 2 and the fixing member 6 are the same as the material of the bottom plate 41, and the material is any one of Polycarbonate (PC). Copolymers of Cycloolefin (COP). Polymethyl Methacrylate (PMMA) and a low-loss optical glass. The connector 6 is a 50-ohm SMA connector. The shape of the reflecting bottom plate 4 is circular, and its radius R=90 mm. The antenna housing 2 and the reflecting bottom plate 4 form a cylindrical hollow structure, and the height of the antenna housing 2 is 155 mm. The supporting plate 1 is a rectangle, wherein its shorter sides a=100 mm, and its longer sides b=100 mm. The shape of the first radiator 32 is the rectangle having four cut corners shown in FIG. 2, wherein two of the cut corners are isosceles triangles, the other two cut corners are equal, ∠β=45°, and ∠α=32.9° The light transmittance of the radiation oscillator 3 may reach 70%-88%.

Figure 6:
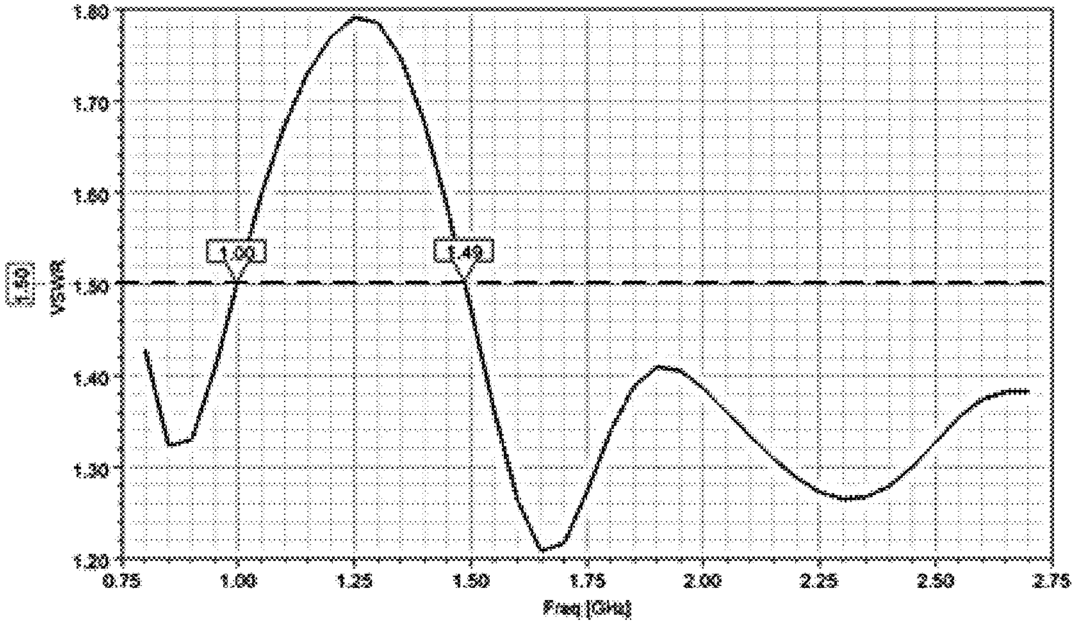
FIG. 6 is a curve diagram of the variation of the standing-wave ratio with the working frequency according to an embodiment of the present application.

FIG. 6 shows a schematic diagram of the curve of the working frequency and the standing-wave ratio of the ceiling antenna. It may be seen from the curve in FIG. 6 that, when the standing-wave ratio (VSWR) is less than 1.8, the working frequency of the ceiling antenna may cover 0.80 GHZ-2.70 GHZ, and when the standing-wave ratio (VSWR) is less than 1.5, the working frequency of the ceiling antenna may cover two frequency bands, 0.80 GHZ-1.00 GHZ and 1.48 GHZ-2.70 GHZ. The ceiling antenna has a very wide working band, may be applied to various communication systems, and has extensive applications.

Furthermore, it should be noted that the standing-wave ratio is fully referred to as voltage standing-wave ratio (VSWR), refers to the ratio of the amplitude of the antinode voltage to the amplitude of the trough voltage of a standing wave, and is also referred to as standing-wave coefficient. When the standing-wave ratio is equal to 1, that indicates that the impedance of the signal inputting terminal and the impedance of the antenna completely match, in which case the whole of the high-frequency energy is radiated out by the antenna, and there is no energy reflection loss. When the standing-wave ratio is infinitely great, that indicates total reflection, wherein the energy is not radiated out at all.

Figure 7:
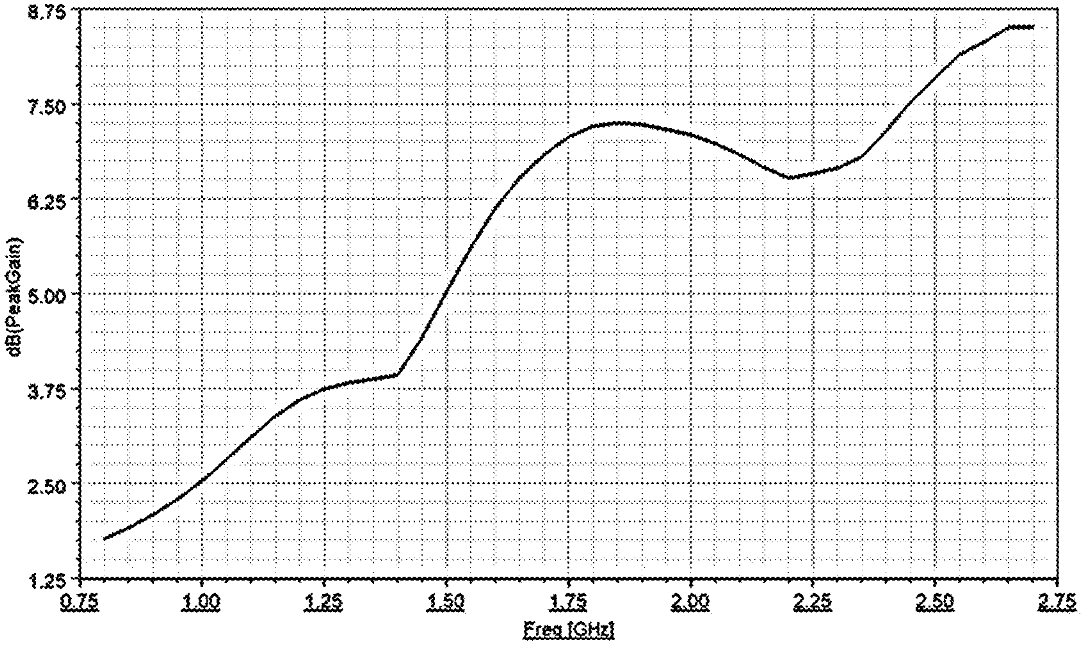
FIG. 7 is a curve diagram of the variation of the gain with the working frequency according to an embodiment of the present application.

FIG. 7 shows a curve diagram of the variation of the gain with the frequency of the ceiling antenna. It can be seen from FIG. 7 that, within the range of the frequency bands of 0.80 GHZ-2.70 GHZ, all of the gains of the ceiling antenna are greater than or equal to 1.75 dB. It should be noted that the gain refers to, on the condition of an equal input power, the ratio of the power densities of the signals generated at the same one point in the space by a practical antenna and an ideal radiation element, and the gain is a physical quantity used to measure the degree of the increasing of the intensity of a radiation signal.

Figure 8:
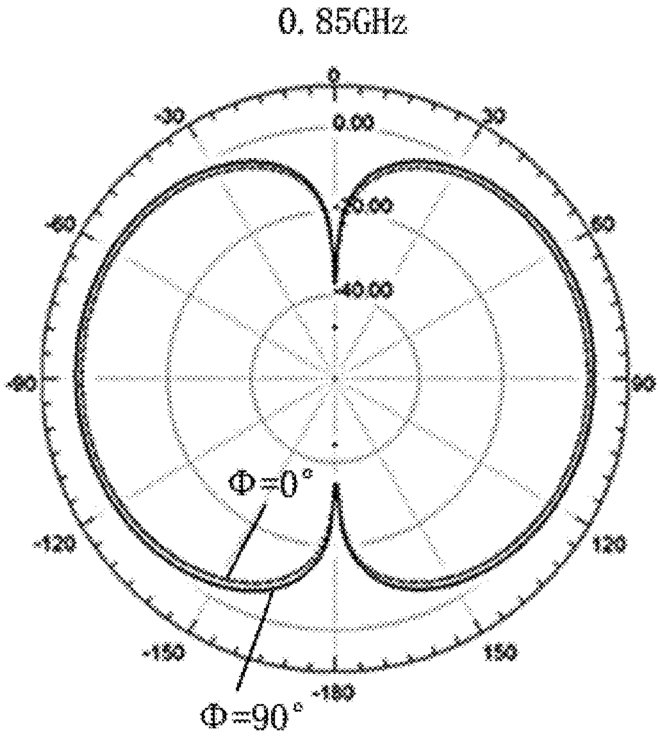
FIG. 8 is radiation-direction diagrams of a ceiling antenna with a center frequency of 0.85 GHz according to an embodiment of the present application.

FIG. 8 shows radiation-direction diagrams of the ceiling antenna when the center frequency is 0.85 GHZ. It should be noted that the radiation-direction diagram of the antenna is actually a three-dimensional spatial pattern, and all of the radiation-direction diagrams according to the embodiments of the present application are a two-dimensional polar-coordinate radiation-direction diagram in the X,Y direction that is provided after the angle φ of the Z direction has been determined. In FIG. 8, when φ=0° and φ=90°, the contours of the radiation-direction diagrams are close and are both approximately of a "∞" shape, and the radiation-direction diagrams have a good symmetry, and cover large radiation areas.

Figure 9:
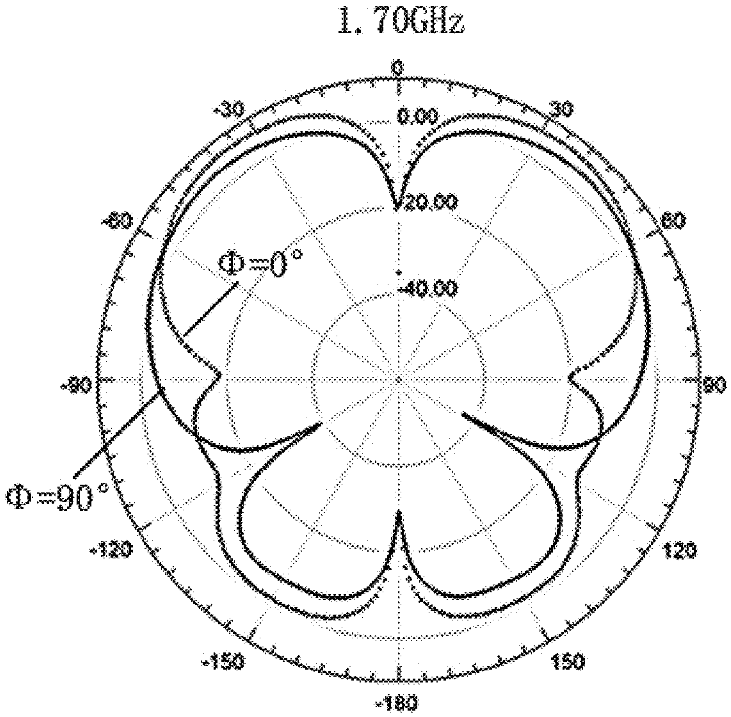
FIG. 9 is radiation-direction diagrams of a ceiling antenna with a center frequency of 1.70 GHz according to an embodiment of the present application.

FIG. 9 shows radiation-direction diagrams of the ceiling antenna when the center frequency is 1.70 GHZ. When φ=0° and φ=90°, both of the contours of the radiation-direction diagrams are of a petaloid shape, the similarity between them is lower than the similarity when the center frequency is 0.85 GHZ, and the radiation areas are slightly smaller than the radiation areas when the center frequency is 0.85 GHZ.

Figure 10:
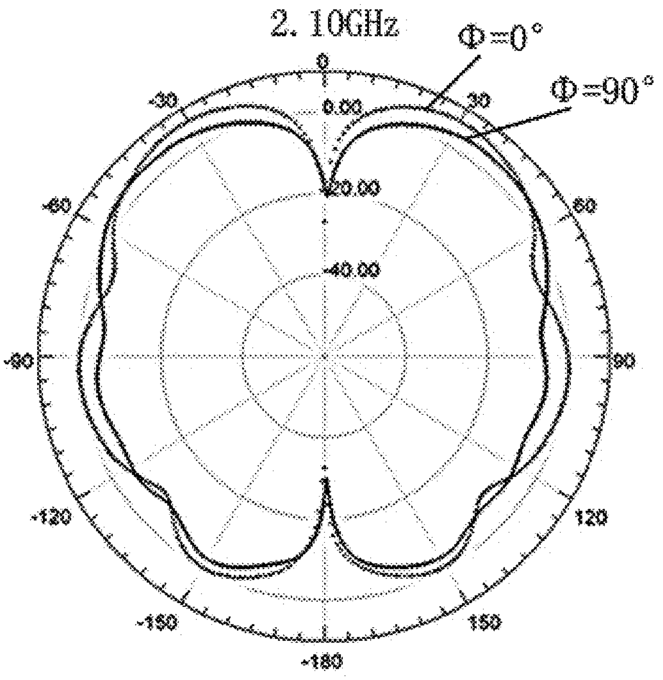
FIG. 10 is radiation-direction diagrams of a ceiling antenna with a center frequency of 2.10 GHz according to an embodiment of the present application.

FIG. 10 shows radiation-direction diagrams of the ceiling antenna when the center frequency is 2.10 GHZ. When φ=0° and φ=90°, both of the contours of the radiation-direction diagrams are of a petaloid shape, and they have a high similarity, and cover large radiation areas.

Figure 11:
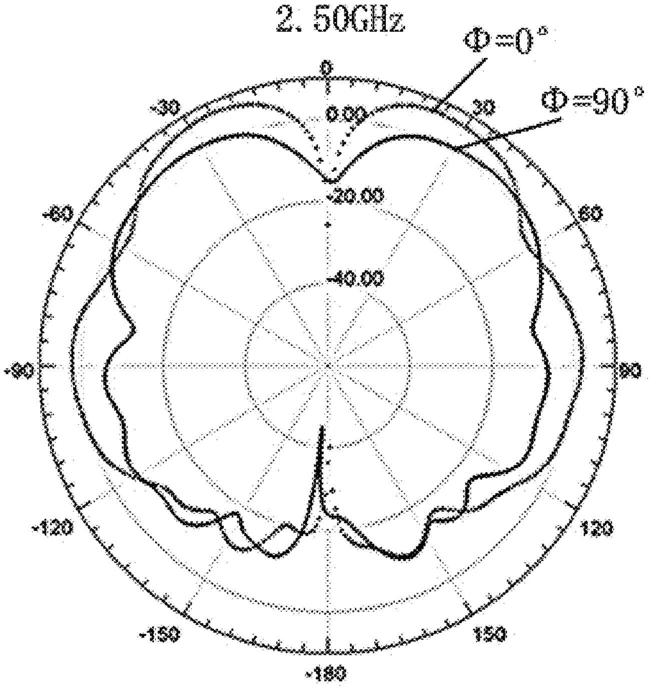
FIG. 11 is radiation-direction diagrams of a ceiling antenna with a center frequency of 2.50 GHz according to an embodiment of the present application.

FIG. 11 shows radiation-direction diagrams of the ceiling antenna when the center frequency is 2.50 GHZ. When φ=0° and φ=90°, both of the contours of the radiation-direction diagrams are of a petaloid shape, the similarity between them is lower than the similarities in FIGS. 8-10, and the areas covered by them are lower either.

In the embodiments of the present application, in an aspect, by configuring that the radiation oscillator 3 of the ceiling antenna has the first radiator 31 of the grid-line-like structure, the light transmitting performance of the radiation oscillator 3 may be improved, whereby, without affecting the electric performance of the radiation oscillator 3, the transparentized radiation oscillator 3 is obtained, thereby improving the aesthetic degree of the ceiling antenna, to enable the ceiling antenna to better blend with the ambient environment. In another aspect, by configuring that the shape of the outer contour of the first radiator 32 is a rectangle having at least one cut corner, the resonance sites of the first radiator 32 may be significantly increased, which may increase the frequency bandwidth of the ceiling antenna, to enable the ceiling antenna to have more extensive applications. Furthermore, by configuring the reflecting layer 42 to be of the grid-line-like structure, in cooperation with the light transmitting base plate and the light transmitting bottom plate 41, the reflecting bottom plate 4 of a good light transmittance may be obtained, whereby, without affecting the reflection and the accumulation of the electric signals by the reflecting bottom plate 4, the transparentized reflecting bottom plate 4 is obtained, thereby improving the aesthetic degree of the ceiling antenna, to enable the ceiling antenna to better blend with the ambient environment.

The above are merely particular embodiments of the present application, and the protection scope of the present application is not limited thereto. All of the variations or substitutions that a person skilled in the art may easily envisage within the technical scope disclosed by the present application should fall within the protection scope of the present application. Therefore, the protection scope of the present application should be subject to the protection scope of the claims.

The invention claimed is:

1. A ceiling antenna, wherein the ceiling antenna comprises:

a reflecting bottom plate, wherein the reflecting bottom plate has a via hole;

a supporting plate, wherein the supporting plate is fixed to the reflecting bottom plate, and a plane where the supporting plate is located is perpendicular to a plane where the reflecting bottom plate is located;

a radiation oscillator, wherein the radiation oscillator is adhered to the supporting plate, the radiation oscillator comprises a substrate and a first radiator located on the substrate, the first radiator has a grid-line-like structure, the substrate is located between the supporting plate and the first radiator, a material of the substrate is a light transmitting insulative material, a thickness of the first radiator in a direction perpendicular to the substrate is configured to be less than a line width of grid lines of the first radiator, and a shape of an outer contour of the first radiator is a rectangle having at least one cut corner; and a connector, wherein the connector is located on one side of the reflecting bottom plate that is away from the radiation oscillator, the via hole exposes a part of area of the connector, and the connector is electrically connected to the radiation oscillator through the via hole;

wherein the radiation oscillator further comprises at least one second radiator located on the substrate, the second radiator is connected to the first radiator, and the second radiator has a same grid-line-like structure as the grid-line-like structure of the first radiator;

wherein the second radiator is provided on one side of the first radiator that is farther from the at least one cut corner, and an area of an orthographic projection of the second radiator on the supporting plate is less than an area of an orthographic projection of the first radiator on the supporting plate.

2. The ceiling antenna according to claim 1, wherein the ceiling antenna further comprises an antenna housing, and the radiation oscillator is located in a cavity formed by the reflecting bottom plate and the antenna housing.

3. The ceiling antenna according to claim 2, wherein the reflecting bottom plate comprises a bottom plate and a reflecting plate located on the bottom plate, the reflecting plate comprises a base plate and a grid-line-like reflecting layer located on the base plate, the base plate is located between the bottom plate and the reflecting layer, and the connector is located on one side of the bottom plate that is away from the reflecting layer.

4. The ceiling antenna according to claim 3, wherein all of materials of the bottom plate, the base plate, the supporting plate, and the antenna housing are the light transmitting insulative material.

5. The ceiling antenna according to claim 1, wherein the first radiator is symmetrical with respect to a reference plane, wherein the reference plane passes through a geometric center of the connector, and is perpendicular to the plane where the reflecting bottom plate is located.

6. The ceiling antenna according to claim 5, wherein the shape of the outer contour of the first radiator is a rectangle having four cut corners, and two of the four cut corners are isosceles right triangles.

7. The ceiling antenna according to claim 5, wherein the shape of the outer contour of the first radiator is a rectangle having four cut corners, all of the four cut corners are an arc-shaped cut corner, and the shape of the outer contour of the first radiator is a rounded rectangle.

8. The ceiling antenna according to claim 1, wherein the first radiator comprises a hollowed-out component, the hollowed-out component is located in a middle of the first radiator, and a shape of an outer contour of the hollowed-out component is any one of an arc shape, a polygon, and a shape spliced by the arc shape and the polygon.

9. The ceiling antenna according to claim 8, wherein the arc shape comprises any one of a circle, an ellipse, a meniscus shape and a sector shape, and the polygon comprises any one of a triangle, a quadrangle, a pentagon and a hexagon.

10. The ceiling antenna according to claim 1, wherein a shape of an outer contour of the second radiator is an arc shape or a polygon.

11. The ceiling antenna according to claim 1, wherein the ceiling antenna further comprises a fixing member, and the supporting plate is fixed to the reflecting bottom plate by the fixing member.

12. The ceiling antenna according to claim 11, wherein the fixing member comprises an L-shaped right-angle connecting member, and a material of the fixing member is a light transmitting insulative material.

13. The ceiling antenna according to claim 1, wherein the ceiling antenna further comprises a bonding part, and the bonding part is located between the substrate of the radiation oscillator and the supporting plate, and is configured to bond the radiation oscillator and the supporting plate together.

14. The ceiling antenna according to claim 2, wherein a shape of the cavity formed by the reflecting bottom plate and the antenna housing is a columnar shape or a hemi-ellipsoidal shape.

* * * * *